(12) United States Patent
Strydom

(10) Patent No.: US 9,206,902 B2
(45) Date of Patent: Dec. 8, 2015

(54) FLANGE SEALING SYSTEM

(76) Inventor: Christiaan Phillipus Strydom, Ballajur (AU)

(*) Notice: Subject to any disclaimer, the term of this patent is extended or adjusted under 35 U.S.C. 154(b) by 617 days.

(21) Appl. No.: 12/807,051

(22) Filed: Aug. 25, 2010

(65) Prior Publication Data

US 2011/0140371 A1    Jun. 16, 2011

(51) Int. Cl.
*F16L 17/06* (2006.01)
*F16J 15/12* (2006.01)
*F16L 23/18* (2006.01)

(52) U.S. Cl.
CPC .............. *F16J 15/127* (2013.01); *F16L 23/18* (2013.01)

(58) Field of Classification Search
USPC .......... 277/608, 609, 610, 616, 630, 637, 639
See application file for complete search history.

(56) References Cited

U.S. PATENT DOCUMENTS

| | | | | |
|---|---|---|---|---|
| 229,070 A * | 6/1880 | Affleck | ......................... | 277/608 |
| 591,863 A * | 10/1897 | Merwarth | ..................... | 277/610 |
| 605,891 A * | 6/1898 | Merwarth | ..................... | 277/609 |
| 1,089,134 A * | 3/1914 | Hettinger | ...................... | 277/633 |
| 2,466,263 A * | 4/1949 | Nardin | .......................... | 277/610 |
| 2,828,987 A * | 4/1958 | Schmitz | ........................ | 277/610 |
| 2,882,083 A * | 4/1959 | Palumbo et al. | ............. | 277/610 |
| 3,285,632 A * | 11/1966 | Dunkle | ........................ | 285/363 |
| 4,002,344 A * | 1/1977 | Smith | ............................ | 277/609 |
| 4,094,520 A * | 6/1978 | Ng et al. | ........................ | 277/609 |
| 4,095,809 A * | 6/1978 | Smith | ............................ | 277/611 |
| 4,189,819 A * | 2/1980 | Nicholson | ...................... | 29/417 |
| 4,364,982 A * | 12/1982 | Gee | .............................. | 428/66.4 |
| 4,388,259 A * | 6/1983 | Jewell et al. | .................. | 264/153 |
| 4,457,517 A * | 7/1984 | Dunegan | ....................... | 277/608 |
| 4,629,199 A * | 12/1986 | Yamamoto et al. | ........... | 277/592 |
| 4,673,187 A * | 6/1987 | Hanson et al. | ................ | 277/314 |
| 4,690,438 A * | 9/1987 | Kanczarek | ..................... | 285/363 |
| 4,854,597 A * | 8/1989 | Leigh | ............................ | 277/314 |
| 5,308,090 A * | 5/1994 | Hamada et al. | ............... | 277/610 |
| 5,427,386 A * | 6/1995 | Breaker | ........................ | 277/627 |
| 5,472,214 A * | 12/1995 | Wainer et al. | ................. | 277/609 |
| 5,511,797 A * | 4/1996 | Nikirk et al. | .................. | 277/609 |
| D374,015 S * | 9/1996 | Wainer et al. | ..................... | D15/5 |
| 5,551,706 A * | 9/1996 | Barna et al. | ................... | 277/312 |
| 5,558,344 A * | 9/1996 | Kestly et al. | ................... | 277/608 |
| 5,609,344 A * | 3/1997 | Tamaoki et al. | .............. | 277/609 |
| 5,664,791 A * | 9/1997 | Owen | ........................... | 277/609 |
| 5,683,091 A * | 11/1997 | Isoe et al. | ...................... | 277/610 |
| 5,794,946 A * | 8/1998 | Owen | ........................... | 277/610 |
| 5,823,542 A * | 10/1998 | Owen | ........................... | 277/603 |
| 5,913,522 A * | 6/1999 | Koch | ............................ | 277/610 |

(Continued)

*Primary Examiner* — Vishal Patel
*Assistant Examiner* — L. Susmitha Koneru
(74) *Attorney, Agent, or Firm* — Matthew Kaser; Adam Warwick Bell

(57) ABSTRACT

A sealing element that provides a fluid tight seal between pipe end flanges of adjoining pipes in a flange sealing system is disclosed. The sealing system also uses a centering ring surrounding and locating the sealing element relative to the pipe end flanges which is discontinuous in a circumferential direction of the centering ring between two ends of the centering ring which are disconnected from one another in a mounted position between the pipe end flanges so that the centering ring can be flexed to replace the sealing element therein upon removal from the pipe end flanges. The centering ring has an inner circumference in the form of a concave wedge-shaped edge and the sealing element has a wedge-shaped cross-section in the form of a convex wedge-shaped edge arranged to be received in the concave wedge-shaped edge of the centering ring.

26 Claims, 7 Drawing Sheets

(56) References Cited

U.S. PATENT DOCUMENTS

| | | | |
|---|---|---|---|
| 5,997,007 A * | 12/1999 | Hanashima et al. | 277/610 |
| 6,224,065 B1 * | 5/2001 | Smith | 277/611 |
| 6,260,854 B1 * | 7/2001 | Lemon | 277/609 |
| 6,402,159 B1 * | 6/2002 | Kohn | 277/608 |
| 6,409,180 B1 * | 6/2002 | Spence et al. | 277/608 |
| 6,581,941 B2 * | 6/2003 | Carr | 277/609 |
| 6,688,609 B2 * | 2/2004 | Shaffer | 277/609 |
| 6,708,983 B2 * | 3/2004 | Reisel et al. | 277/592 |
| 6,708,985 B1 * | 3/2004 | Doyle | 277/616 |
| 6,719,295 B2 * | 4/2004 | Mohammed-Fakir et al. | 277/411 |
| 6,945,539 B2 * | 9/2005 | Whitlow et al. | 277/616 |
| 6,948,717 B1 * | 9/2005 | Carr | 277/609 |
| 6,948,719 B2 * | 9/2005 | Dron | 277/628 |
| RE39,973 E * | 1/2008 | Spence et al. | 277/608 |
| 8,104,773 B2 * | 1/2012 | Schroeder et al. | 277/608 |
| 8,333,386 B2 * | 12/2012 | Takeda et al. | 277/608 |
| 2001/0050463 A1 * | 12/2001 | Ito | 277/630 |
| 2002/0153672 A1 * | 10/2002 | Caplain et al. | 277/608 |
| 2003/0080517 A1 * | 5/2003 | Reisel et al. | 277/610 |
| 2003/0132579 A1 * | 7/2003 | Hoyes et al. | 277/610 |
| 2004/0032092 A1 * | 2/2004 | Potter | 277/608 |
| 2004/0145123 A1 * | 7/2004 | Hystad | 277/608 |
| 2005/0035557 A1 * | 2/2005 | Crawford | 277/609 |
| 2005/0116427 A1 * | 6/2005 | Seidel et al. | 277/610 |
| 2005/0206092 A1 * | 9/2005 | Pedro et al. | 277/608 |
| 2007/0145691 A1 * | 6/2007 | Katsura | 277/609 |
| 2008/0018057 A1 * | 1/2008 | Gibb et al. | 277/608 |
| 2009/0115139 A1 * | 5/2009 | Jenkins et al. | 277/610 |
| 2011/0315399 A1 * | 12/2011 | Rodney et al. | 166/380 |
| 2012/0274031 A1 * | 11/2012 | Knapp | 277/609 |

* cited by examiner

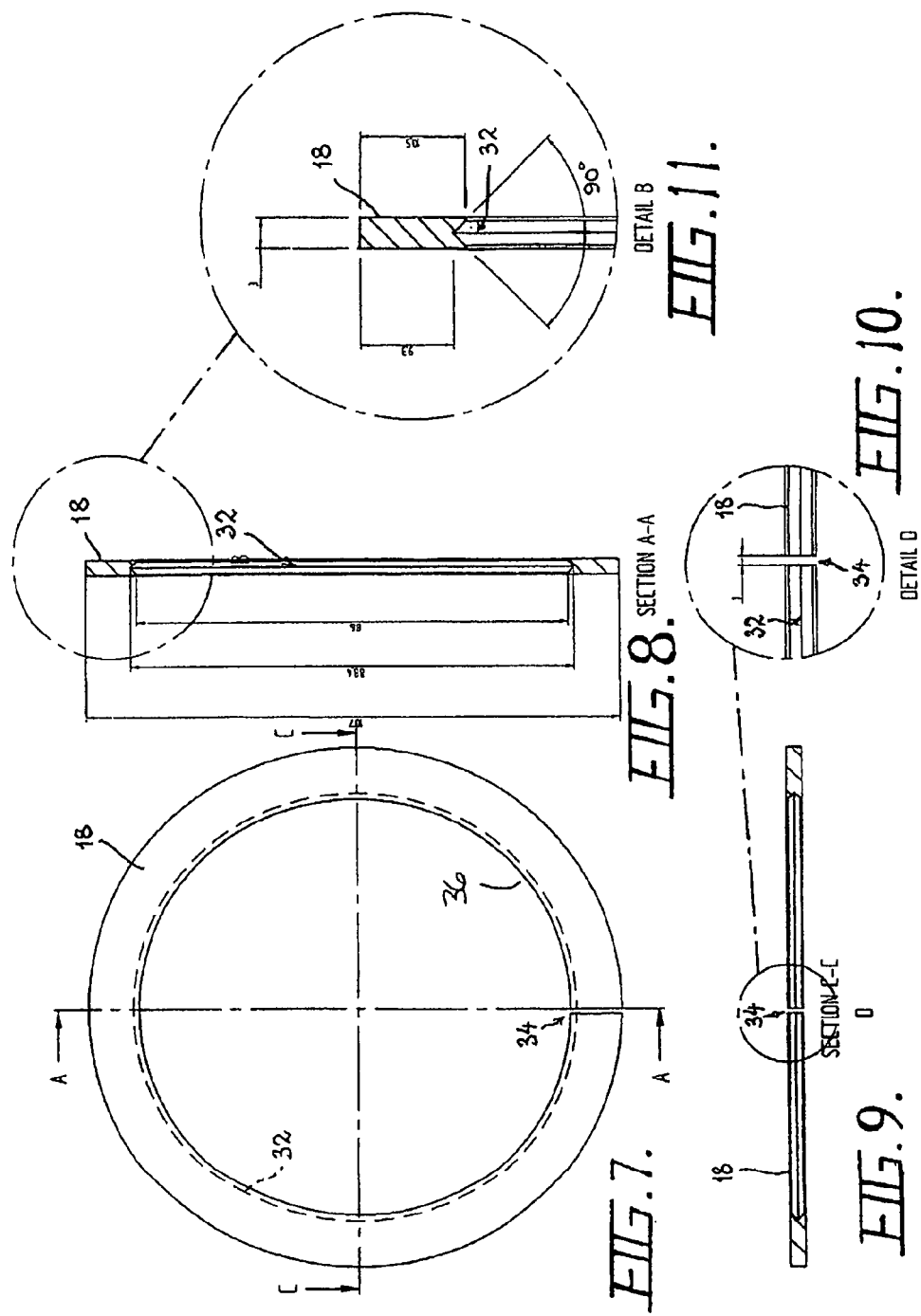

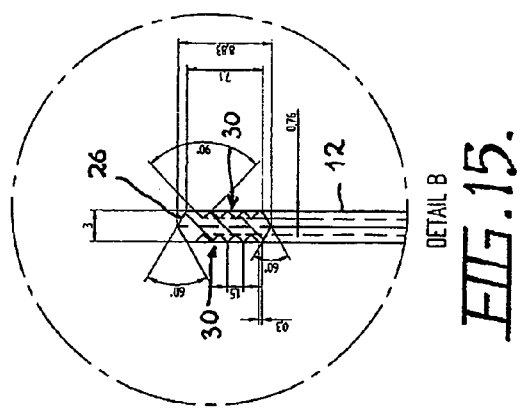
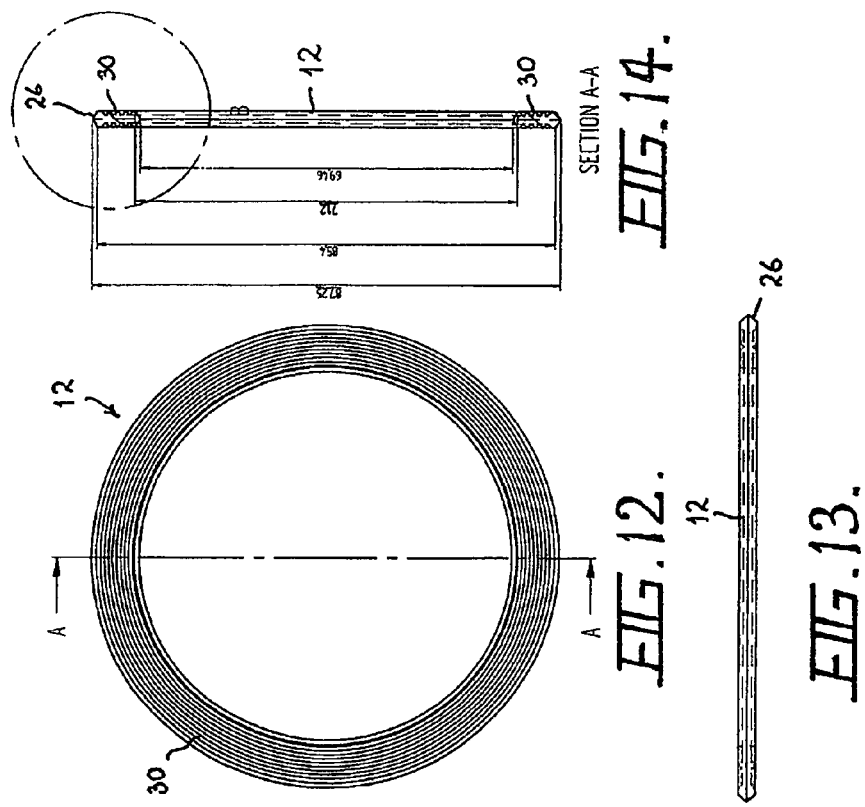

FLANGE SEALING SYSTEM

This application claims priority to and benefit of Australian Provisional Patent Application No. 2009904213, filed Sep. 3, 2009, entitled "Flange Sealing System", the entire disclosure of which is hereby incorporated by reference into the present disclosure.

FIELD OF THE INVENTION

The present invention relates to a flange sealing system for sealing the flanges of two adjoining pipes and relates particularly, though not exclusively, to a single sized gasket designed for multiple flange standards.

BACKGROUND TO THE INVENTION

In a wide variety of industries, including the food processing, chemical and mineral processing industries, fluids are conveyed via pipelines between stages within an industrial plant or process, or between the plant and end users. At every point where one pipe joins another pipe, there is a flange connection to permit the pipes to be joined together, typically by bolts and nuts and sometimes by welding. Each flange connection requires a sealing system to ensure a fluid-tight seal is maintained between the flanges. A common prior art sealing system is the spiral-wound gasket.

Spiral-wound gaskets are formed from a metal strip, typically stainless steel, which is wound together with a filler material such as graphite, TEFLON (Registered Trade Mark), treated asbestos fibre, etc, to form a core. A constant tensile force is applied during the winding process to give the core an inherent recovery force or resilience under compressive load. Both supported and unsupported spiral-wound gaskets are common. A supported spiral-wound gasket is provided with a solid outer metal ring which is used as a centering and compression control device. To further enhance the pressure rating of the gasket a solid metal inner ring may also be provided.

There are many other types of gaskets and flange sealing systems apart from spiral-wound gaskets. However there is a common problem with these prior art sealing systems. Each gasket or flange sealing system must be manufactured to fit or comply with the particular pressure class and/or flange standard applicable to the pipeline concerned. There are a number of international flange standards employed including British Standard (BS), American National Standards Institute (ANSI), Japanese International Standards (JIS) and Deutsches Institut für Normung (DIN). This has resulted in a proliferation of products designed to fit each of the international flange standards, as well as the numerous pressure ratings of various pipelines. Therefore in order to provide adequate service and maintenance of pipelines it is necessary for companies to hold a huge inventory of spare gaskets and sealing systems in stock. This adds considerably to the cost of maintenance and as well as warehousing costs.

When using a centering ring to locate a sealing element relative to two pipe end flanges fastened together, prior art configurations teach that the ring must be mounted to fully and continuously surround the sealing element to provide sufficient support to the sealing element. One example of continuous support about the circumference of a Sealing Gasket is described in British Patent 1,017,294 by Quinson.

U.S. Pat. No. 1,896,795 by Kendall discloses a further example of a sealing element supported by a centering ring. In this instance, the centering ring is initially formed to be discontinuous to allow flexing when the sealing element is inserted therein. Kendall teaches that the ends of the discontinuous ring must be joined together by lugs prior to placement in a mounted position between the end flanges in order to provide sufficient support to maintain the centering ring in position about the sealing element in use. Once the ends of the centering ring are joined, the sealing element can no longer be readily removed so that the centering ring and sealing element are discarded together once the sealing element is no longer in suitable condition for sealing.

Veiga, U.S. Pat. No. 6,994,356, discloses another example of a sealing element supported by a surrounding centering ring. The centering ring is formed from two semi-circular sections which are joined about the sealing element by welding the ends together. Similarly to Kendall noted above, once the sections of the centering ring are joined about the sealing element, the sealing element can no longer be readily removed so that the centering ring and sealing element are discarded together once the sealing element is no longer in suitable condition for sealing.

U.S. Pat. No. 1,892,416 by Ruhe et al. discloses a sealing member for flanged joints which requires a centering collar to be provided about which the sealing element is supported. An outer support ring is provided to maintain support of the sealing element about the inner centering collar. The outer support ring is discontinuous and is flexible to allow removal and replacement of the sealing element. In order to adequately support the sealing element, Ruhe et al. teaches that the sealing element must be mounted about the inner collar and that a spring must be connected between the disconnected ends of the outer support ring prior to placement in the mounted position. The spring construction is awkward to install and to maintain so that the resulting sealing member is costly and has a life which is limited by the spring used to maintain the tension of the outer ring about the sealing element.

References to prior art in this specification are provided for illustrative purposes only and are not to be taken as an admission that such prior art is part of the common general knowledge in Australia or elsewhere.

SUMMARY OF THE INVENTION

The present invention was developed with a view to providing a simplified flange sealing system that can be used with a wide range of international flange standards and pipeline pressure ratings.

According to one aspect of the present invention there is provided a flange sealing system in combination with a pair of pipe end flanges of adjoining pipes joined to one another by fasteners, the flange sealing system comprising:

an annular sealing element between the end flanges having first and second faces in sealing engagement with respective ones of the end flanges so as to provide a fluid-tight seal between the end flanges; and a centering ring surrounding the annular sealing element so as to be arranged to locate the sealing element relative to the fastened pipe end flanges;

the centering ring being discontinuous in a circumferential direction of the centering ring between two ends of the centering ring which are disconnected from one another in a mounted position between the pipe end flanges;

an outer circumference of the annular sealing element being wedged within an inner circumference of the centering ring; and the centering ring being flexible so as to permit insertion and removal of the sealing element within the centering ring.

The centering ring according to the present invention, which locates the sealing element relative to the fastening between the flanges, is suitable to provide sufficient support to the sealing element by itself even when the ends remain disconnected so that the sealing element remains readily replacement upon removal of the sealing assembly from the pipe flanges. The simplicity of the centering ring construction with opposed ends which remain disconnected is of low cost and complexity to assemble which having an extended life due to the simple and durable construction thereof.

The centering ring is preferably resilient so as to be self-supported under tension about the annular sealing member such that the outer circumference of the annular sealing element is wedged under compression within the inner circumference of the centering ring solely by the tension of the annular sealing member. By relying only on the stiffness of the centering ring to locate the sealing element and to provide sufficient compression to the sealing element in the mounted position, no other components are required which effectively minimizes cost and maintenance associated with the sealing assembly as compared to prior art configurations.

Preferably the outer circumference of the sealing element has a wedge-shaped cross-section in the form of a convex wedge-shaped edge, and the inner circumference of the centering ring has a concave cross-section in the form of a concave wedge-shaped edge so as to be shaped to receive the wedge-shaped edge of the sealing element therein.

Preferably the convex wedge-shaped edge of the sealing element is flatter than the concave wedge-shaped edge of the centering ring.

An outer diameter of an apex of the convex wedge-shaped edge of the sealing element is preferably less than a maximum inner diameter of the centering ring at an apex of the concave wedge-shaped edge and greater than a minimum inner diameter of the concave wedge-shaped edge of the centering ring adjacent the first and second faces of the sealing element.

The flange sealing system may further comprise an inner member having an outer circumference comprising a concave wedge-shaped edge, wherein the annular sealing element has an inner circumference comprising a convex wedge-shaped edge. In this instance, the outer circumference of the inner member is preferably received within the inner circumference of the sealing member such that the convex wedge-shaped edge of the inner circumference of the annular sealing element is received within the concave wedge-shaped edge of the outer circumference of the inner member.

Preferably the concave wedge-shaped edge of the outer circumference of the inner member is flatter than the convex wedge-shaped edge of the inner circumference of the sealing element.

The inner member may be selected from the group including a spacer between the sealing element and an inner diameter of the pipes, a primary seal between the annular sealing element and the inner diameter of the pipes, an orifice plate having an aperture with a diameter smaller than the inner diameter of the pipes, and a blank fully spanning the inner diameter of the pipes to block flow in the pipes.

The inner member may comprise a metal insert having a thickness which is substantially identical to a thickness of the sealing member between the first and second faces thereof.

Alternatively, the inner member may comprise a material which is softer than a material of the sealing member, the inner member having a thickness which is greater than a thickness of the sealing member between the first and second faces thereof.

Preferably the centering ring includes at least one fastener aperture extending therethrough between the first and second faces and which is arranged to receive a respective fastener therethrough which fastens the pipe end flanges. The centering ring may include only a single fastener aperture defined by an auxiliary mounting ring joined integrally with the centering. Alternatively the centering ring may include a plurality of circumferentially spaced apart fastener apertures extending therethrough between the first and second faces in which each fastener aperture receives a respective fastener which fastens the pipe end flanges together.

The centering ring may be made discontinuous by the provision of a radial cut which forms a gap in the circumference of the ring which is preferably between about 1.0 mm to 2.0 mm wide in the circumferential direction.

When provided in combination with a plurality of centering rings of different size so as to be arranged to fit a wide range of standard pipe and flange sizes, each centering ring preferably comprises an inner circumference into which the outer circumference of the same annular sealing member is arranged to be wedged.

The first and second faces of the sealing element may be each formed with a serrated surface.

The first and second faces of the sealing element may also be provided with a suitable sealing compound to further improve the fluid-tight seal. The sealing compound is preferably selected from the group including polytetrafluoroethylene, graphite, a mica based compound, composite non-asbestos fiber, and rubber based laminations.

According to a second aspect of the present invention there is provided a sealing element for use with a flange sealing system including a pair of pipe end flanges of adjoining pipes and a centering ring for mounting between the end flanges in which the centering ring has an inner circumference in the form of a wedge-shaped edge, the annular sealing element comprising:

an annular structure having an outer circumference arranged to be received within the inner circumference of the centering ring and having first and second faces arranged for sealing engagement with respective ones of the end flanges so as to provide a fluid-tight seal between the end flanges;

the outer circumference of the sealing element having a wedge-shaped cross-section in the form of a wedge-shaped edge arranged to be mated with the wedge-shaped edge of the centering ring.

When the centering ring has a concave wedge-shaped edge on the inner circumference, preferably the sealing element has a convex wedge-shaped edge on the outer circumference thereof. Furthermore the convex wedge-shaped edge of the sealing element is preferably arranged to be flatter than the concave wedge-shaped edge of the centering ring.

In some instance, an inner member may be provided having an outer circumference comprising a concave wedge-shaped edge. In this instance, the annular sealing element preferably an inner circumference comprising a convex wedge-shaped edge with the outer circumference of the inner member being received within the inner circumference of the sealing member such that the convex wedge-shaped edge of the inner circumference of the annular sealing element is received within the concave wedge-shaped edge of the outer circumference of the inner member.

Preferably the concave wedge-shaped edge of the outer circumference of the inner member is flatter than the convex wedge-shaped edge of the inner circumference of the sealing element.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of flange sealing system, given by way of example only, with reference to the accompanying drawings, in which:

FIG. 7 is a plan view of the centering ring illustrated in FIG. 1;

FIG. 8 is a section view of the centering ring of FIG. 7 through the line A-A;

FIG. 9 is a section view of the centering ring of FIG. 7 through the line C-C;

FIG. 10 is an enlargement of the section of the centering ring of FIG. 9 at D;

FIG. 11 is an enlargement of the section of the centering ring of FIG. 8 at B;

FIG. 12 is a plan view of the sealing element illustrated in FIG. 6;

FIG. 13 is a side elevation of the sealing element of FIG. 12;

FIG. 14 is a section view of the centering ring of FIG. 12 through the line A-A;

FIG. 15 is an enlargement of the section of the sealing element of FIG. 14 at B;

In the drawings like characters of reference indicate corresponding parts in the different figures.

DETAILED DESCRIPTION OF PREFERRED EMBODIMENTS

Figure 1:
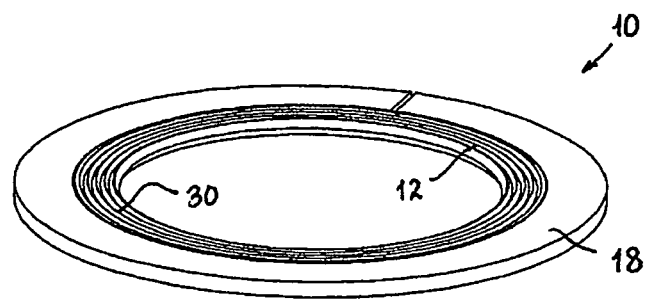
FIG. 1 is a top perspective view of a first embodiment of the flange sealing system according to the present invention.
Figure 3:
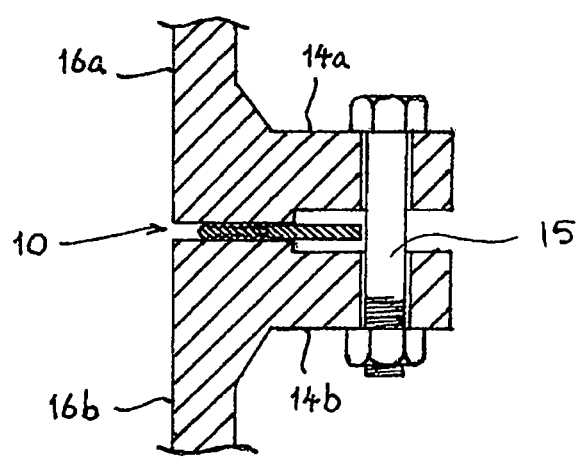
FIG. 3 is a section view of one half of a flange connection showing the sealing element of FIG. 1 in situ.
Figure 4:
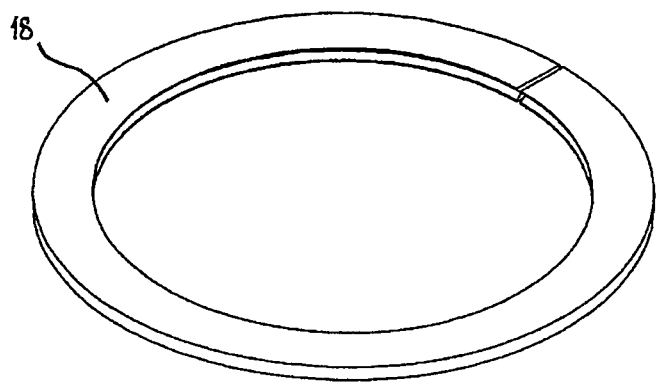
FIG. 4 is a top perspective view of a centering ring employed in the flange sealing system of FIG. 1.
Figure 5:
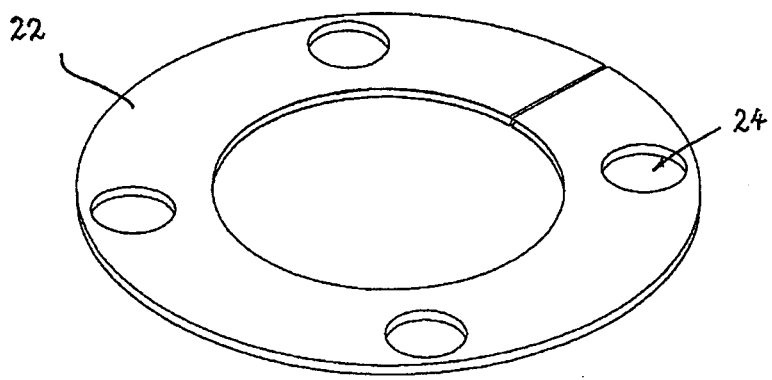
FIG. 5 is a top perspective view of a centering ring employed in the flange sealing system of FIG. 2.
Figure 6:
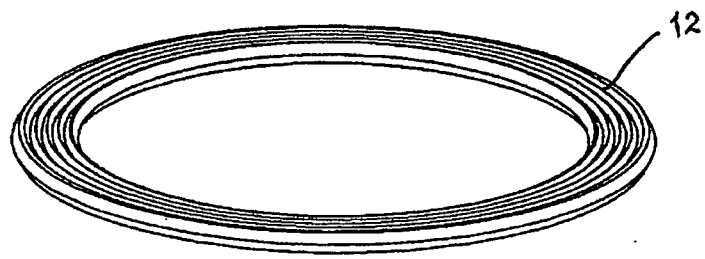
FIG. 6 is a top perspective view of a sealing element employed in the flange sealing system of both FIGS. 1 and 2.

A first embodiment of a flange sealing system 10 in accordance with the present invention, as illustrated in FIG. 1, comprises an annular sealing element 12 for providing a fluid-tight seal between the respective end flanges 14 of a flange connection between adjoining pipes 16 (see FIG. 3). The sealing system 10 further comprises a centering ring 18 for centering the sealing element 12 between the flanges 14 and for locating the sealing element 12 relative to the flange bolts 15 which are connected between the flanges 14. The centering ring 18 is discontinuous so as to be flexible and permit the insertion and removal of the sealing element 12 within the centering ring 18.

Figure 2:
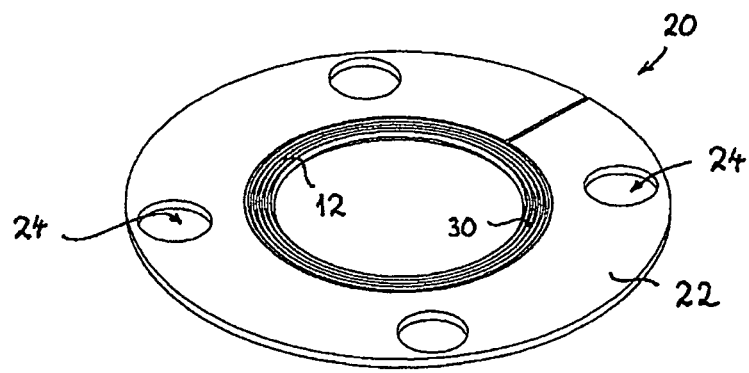
FIG. 2 is a top perspective view of a second embodiment of the flange sealing system according to the present invention.

FIG. 2 illustrates a second embodiment of the flange sealing system 20. The sealing system 20 likewise comprises an annular sealing element 12, which is substantially identical to the sealing element 12 of the first embodiment, and a centering ring 22 for locating the sealing element relative to the flange bolts 15 extending between the end flanges 14. The assembly of FIG. 2 employs a full face style centering ring 22 that is provided with bolt holes 24 through which the flange bolts pass in situ. The bolt holes 24 are circumferentially spaced apart from one another for alignment with respective ones of the flange bolts 15 received therethrough. Each of the bolt holes can be used individually to hang the centering ring by using a bolt, from the flange after it has been removed from service. The sealing element could be installed back into the guide ring whilst in this position and then pivoted about the selected bolt back into its service position. As with the first embodiment the centering ring 22 is discontinuous so as to be flexible and permit the insertion and removal of the sealing element 12 within the centering ring 22.

Figure 18:
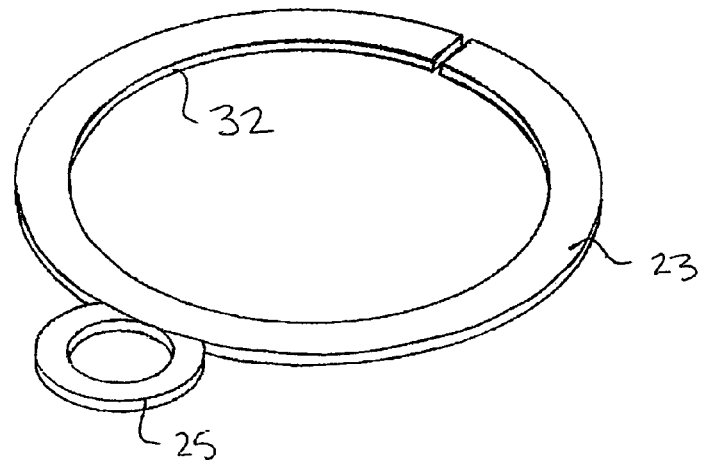
FIG. 18 is a perspective view of an alternative embodiment of the centering ring.
Figure 19:
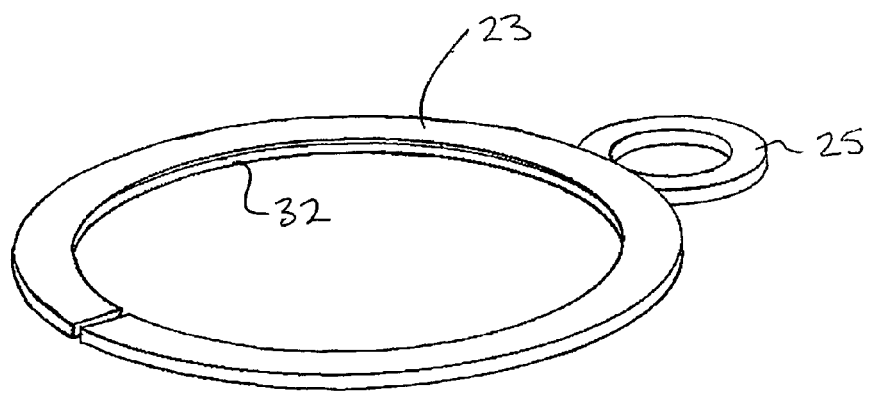
FIG. 19 is another perspective view of the centering ring according to FIG. 18.

FIG. 18 illustrates a third embodiment of the flange sealing system comprising a centering ring 23 which receives the same annular sealing element 12 therein as in the previous embodiments. The centering ring 23 in this instance has an outer radius which corresponds the radial distance from the center of the pipes to the inner side of the flange bolts 15 similarly to the ring 18 shown in FIGS. 1 and 3 for locating the sealing element 12 therein relative to the flange bolts 15 in the end flanges of the pipes. As shown in FIGS. 18 and 19, the third embodiment of the centering ring 23 differs from the first embodiment of FIGS. 1 and 3 by providing an additional mounting ring 25 fixed to an outer circumference of the centering ring 23 diametrically opposite from a gap 34 in the discontinuous centering ring 23. The mounting ring 25 is a flat annular member which lies in a common plane with the centering ring 23 for being clamped between the pipe end flanges together with the centering ring. An inner diameter of the mounting ring 25 defines a fastener aperture extending fully through the ring between opposed first and second faces thereof so as to receive one of the flange bolts 15 therethrough. The inner diameter of the fastener aperture corresponds approximately to the diameter of the flange bolt 15 received therethrough. The mounting ring 25 is located at the periphery of the centering ring 23 so as to be aligned with the fastener apertures of the pipe end flanges receiving one of the bolts therethrough when the centering ring 23 is mounted concentrically with the pipe end flanges and the outer circumference of the centering ring 23 is aligned with the inner side of each of the flange bolts 15 circumferentially spaced thereabout. Similarly to the bolt holes in the full face centering ring noted above, the mounting ring 25 can be used to hang the centering ring by using a bolt, from the flange after it has been removed from service. The sealing element could be installed back into the guide ring whilst in this position and then pivoted about the flange bolt in the mounting ring 25 back into its service position.

In all embodiments the sealing element 12 is preferably adapted to be wedged within the respective centering ring 18, 22 or 23. The outside diameter of the sealing element 12 is approximately equal to the internal diameter of the centering ring. By flexing the centering ring the sealing element 12 can be inserted within the centering ring 18, 22 or 23. Preferably an outer circumference of the sealing element 12 is adapted to engage with an inner circumference of the centering ring 18, 22 or 23.

As can be seen most clearly in FIGS. 13, 14 and 15, the outer circumference of the sealing element 12 has a wedge-shaped cross-section in the form of a convex wedge-shaped edge 26. Similarly, as can be seen most clearly in FIGS. 8, 9 and 11, the inner circumference of the centering ring 18 has a concave cross-section shaped to receive the wedge-shaped edge of the sealing element 12 therein. In this embodiment the internal angle between the respective bevelled faces of the wedge-shaped edge 26 is 120°. On the other hand, as can be seen most clearly in FIGS. 8, 9 and 11, the concave cross-section of the inner circumference of the centering ring 18 is in the form of an internal circumferential groove 32 with an internal angle of 90°. The slightly shallower angle of the wedge-shaped edge 36 helps to facilitate insertion and removal of the sealing element from within the internal groove 32. In another embodiment, the the internal angle between the respective bevelled faces of the wedge-shaped edge 26 can be between about 90° and about 120°, for example 90°, 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, 115°, 116°, 117°, 118°, 119°, and 120°. In some embodiments the internal angle can be less than 90°. In some alternative embodiments, the internal angle can be more than 120°.

As described herein, the inner circumference of the centering ring comprises a concave wedge-shaped edge comprising first and second surface portions adjacent respective first and second faces of the centering ring which engage respective end flanges of the joined pipes. The first and second surface portions are generally flat and transverse to one another so as to be inclined towards an inwardly recessed central apex. The inner circumference of the centering ring is suited for generally mating connection with the outer circumference of the sealing element.

Also as described herein, the outer circumference of the sealing element comprises a convex wedge-shaped edge, formed of first and second surface portions, adjacent respective first and second faces of the sealing element, and which are generally flat and transverse to one another so as to be inclined towards an outwardly projecting central apex of the outer circumference 26. The first and second surface portions of the sealing element are at a greater angle relative to one another so that the apex is flatter than the inwardly recessed apex of the centering ring. As shown in the accompanying figures, the convex wedge-shaped edge defines an interior angle between the first and second surface portions which is less than 180 degrees and the concave wedge-shaped edge defines an exterior angle between the first and second surface portions which is less than 180 degrees, in which the interior angle of the convex wedge-shaped edge is greater than the exterior angle of the concave wedge-shaped edge. The concave wedge-shaped edge of the inner circumference of the centering ring is thus sharper than the convex wedge-shaped edge of the outer circumference of the sealing element. The outer circumference of the sealing element is received within the outer circumference of the centering ring such that the convex wedge-shaped edge of the outer circumference of the annular sealing element is wedged into the concave wedge-shaped edge of the inner circumference of the centering ring.

Figure 16A:
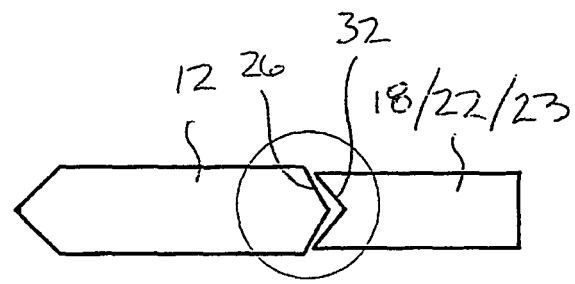
FIG. 16A is a cross sectional view of a small diameter sealing element and centering ring combination.
Figure 16B:
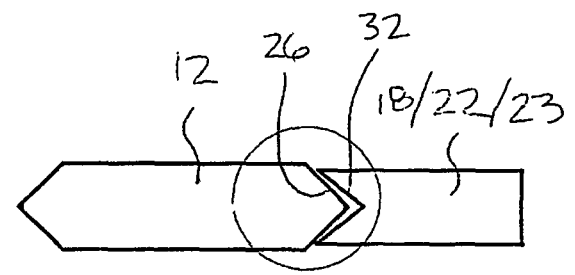
FIG. 16B is a cross sectional view of an intermediate diameter sealing element and centering ring combination which are larger in diameter than the sealing element and centering ring of FIG. 16A.
Figure 16C:
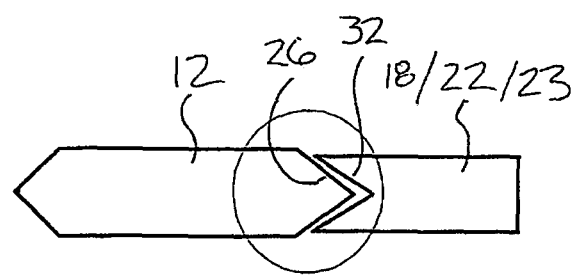
FIG. 16C is a cross sectional view of a large diameter sealing element and centering ring combination which are larger in diameter than the sealing element and centering ring of FIG. 16B.

The maximum outer diameter at the apex of the convex wedge-shaped outer edge of the sealing element is arranged to be greater than a minimum inner diameter of the centering ring adjacent the opposing first and second faces thereof so as to ensure an overlap of a portion of the sealing element and the centering ring in the radial direction. The maximum inner diameter at the apex of the concave wedge-shaped edge of the centering ring is greater than the maximum outer diameter at the apex of the outer edge of the sealing element so that the compressive friction fit of the sealing element within the centering ring is concentrated at spaced apart annular contact areas adjacent the opposing first and second faces of the sealing element. As best shown in FIGS. 16A to 16C, the centering ring 18 and the sealing member 12 engage one another at the stated two annular points of contact adjacent opposing first and second faces of the sealing member because of the greater magnitude of the interior angle between the flat surface portions of the convex wedge shaped edge 26 relative to the exterior angle between the flat surface portions of the concave wedge shaped edge 32. Furthermore, the resultant gap between the flat surface portions of the convex wedge shaped edge 26 and the flat surface portions of the concave wedge shaped edge varies in dimension between the two noted annular points of contacts as a result of the non-parallel relationship between the flat surface portions of the convex wedge shaped edge 26 and the flat surface portions of the concave wedge shaped edge 32.

The angle of the wedge-shaped edge can be changed to assist in ease of insertion for various pipe sizes in all flange standards as shown in FIGS. 16A, 16B and 16C. When the size of the gaskets increase, the angle of the wedge would change to allow for the sealing element entry into the centering ring and to give the guide ring better location and more rigidity as a unit with the sealing element. Although the relationship between the sealing element and the centering ring are similar in each instance, typically both the inner circumference of the centering ring and the outer circumference of the sealing element have a flatter profile for a smaller gasket size than for an intermediate gasket size. Similarly both the inner circumference of the centering ring and the outer circumference of the sealing element have a flatter profile for an intermediate gasket size than for a larger gasket size. The apex of the concave and convex wedge shaped edges are thus sharper and more pointed with increasing gasket size while the overall edge profile becomes flatter and less pronounced with decreasing gasket size.

The sealing element 12 typically has first and second faces adapted to engage with the respective flanges 14 of adjoining pipes 16 to form the fluid-tight seal. Advantageously the first and second faces of the sealing element 12 are each formed with a serrated surface 30. As can be seen most clearly in FIG. 15, the serrations 30 are formed by annular V-shaped grooves with peaks spaced radially at 1.5 mm intervals and their respective facing walls at 90° to each other. The serrations 30 on the sealing element are designed to engage with the respect flanges 14 of the adjoining pipes, as shown in FIG. 3, to provide a fluid-tight seal. The sealing element of this embodiment is manufactured with a solid metal core, typically stainless steel. However it will be understood that the sealing element, which acts as a gasket in the flange sealing system, can be made in many forms, for example in the form of a spiral-wound gasket. While the present description focuses on Kammprofile technology, the sealing element could take on other forms such as flat metal laminate (Klinger Type 108), insulation gaskets, RTJ replacement gaskets (elastomeric sealing elements), and spiral wound gaskets.

Preferably the first and second faces of the sealing element 12 are provided with a suitable sealing compound (not shown) to further improve the fluid-tight seal. A layer of the sealing compound is typically applied over the top of the serrated surface 30. Typical sealing compounds include TEFLON (Registered Trade Mark), graphite and mica based compounds, composite non-asbestos fibre, and rubber based laminations. The sealing element 12 can be readily refurbished by replacing the sealing compound prior to reinsertion into a centering ring.

Advantageously the same sealing element 12 can be employed with multiple centering rings to fit a wide range of standard pipe and flange sizes. All of the various guide rings for all the flange standards and pressure classes within those standards may be arranged to mate with a common sized sealing element for each pipe size from ½" to 24" (12 NB to 600 NB) but is not limited to those sizes. For example, the pipe size may be ½", ¾", 1", 1¼", 1½", 1¾", 2", 2½", 3", 3½", 4", 4½", 5", 5½", 6", 6½", 7", 7½", 8", 8½", 9", 9½", 10", 11", 12", 13", 14", 15", 16", 17", 18", 19", 20", 21", 22", 23", or 24". The guide ring can be manufactured to also accommodate non-standard flange types and still utilise the standard sealing element. The system can also be extended to most larger sizes (around 2500 NB). In all cases the guide ring can be re-used under most conditions for the life of the plant.

The outside diameter of the sealing element 12 is typically about 87 mm with an internal diameter of about 70 mm. These dimensions are typical of a 2" (inch) or 50 NB sealing element. The outside diameter of the centering ring is changed to suit the flange pressure rating and/or flange standard as required by the application. In this way the flange sealing system of the present invention can be employed over a wide range of pipe sizes with nominal bore (NB) from as small as 12 mm up to 600 mm. For example, the nominal bore may be 12 mm, 13 mm, 14 mm, 15 mm, 16 mm, 17 mm, 18 mm, 19 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm, 150 mm, 155 mm, 160 mm, 165 mm, 170 mm, 175 mm, 180 mm, 185 mm, 190 mm, 195 mm, or 200 mm. The centering ring, which acts as a flange adaptor in the sealing system, is designed to remain with the flange joint assembly to be continually reused with new sealing elements as required.

Typically the centering ring is made discontinuous by the provision of a radial cut which forms a circumferential gap 34 in the ring. Typically the circumferential gap 34 is between about 1.0 mm to 2.0 mm wide, as can be seen most clearly in FIGS. 9 and 10. The presence of the gap 34 means that the centering ring can be manually flexed to facilitate insertion of the sealing element 12. The centering ring is typically manufactured from high-grade carbon steel, but can be manufactured from any other suitable material, for example titanium, depending on the application and the chemical environment. The gap in the centering ring results in the centering ring being substantially C-shaped between two opposing ends between which the gap spans in the circumferential direction.

The gap thus ensures that the two opposing ends remain disconnected from one another in a mounted position so that when subsequently removing the centering ring, the sealing element can still be readily removed and replaced. The ease of replacing the sealing element and reusing the centering ring is an environmental benefit. The main environmental positive is the resource efficiency of having a single guide ring associated with a flange for the life of the equipment thus eliminating the disposal of the steel ring element that can happen as often as twice a year. On a major petrochemical plant this can equate to several tonnes of steel not disposed of over the life of the plant.

Although the centering ring is flexible to permit replacement of the sealing element, the centering ring has a degree of resilience which retains sufficient stiffness that the sealing member must be wedged into the centering ring when inserted therein. The centering ring is thus flexed radially outward from a relaxed position to a flexed position under tension about the sealing member once the sealing member is received therein such that the tension of the centering ring by itself in the mounted position provides sufficient force of compression about the circumference of the sealing member to fix the sealing member within the centering ring.

In some applications, there is also provided an inner member 40 formed from a flat member received between the end flanges so as to be surrounding by the annular sealing element. The inner member 40 has an outer circumference 42 comprising a concave wedge-shaped edge comprising first and second surface portions adjacent respective first and second faces of the inner member arranged for engagement with respective end flanges of the joined pipes. The first and second surface portions are generally flat and transverse to one another so as to be inclined towards an inwardly recessed central apex. The outer circumference 42 is suited for generally mating connection with the inner circumference 44 of the sealing element.

In this instance, the inner circumference of the sealing element comprises a convex wedge-shaped edge, also formed of first and second surface portions, adjacent respective first and second faces of the sealing element, and which are generally flat and transverse to one another so as to be inclined towards an outwardly projecting central apex. The first and second surface portions of the sealing element are at a smaller angle relative to one another so that the apex is sharper in angle than the inwardly recessed apex of the inner member. Accordingly as shown in the accompany figures, the concave wedge-shaped edge of the inner member defines an exterior angle between the first and second surface portions which is less than 180 degrees and the convex wedge-shaped edge of the sealing member defines an interior angle between the first and second surface portions which is less than 180 degrees such that the exterior angle of the concave wedge shaped edge is greater than the interior angle of the convex wedge-shaped edge of the inner circumference of the sealing element. The concave wedge-shaped edge of the outer circumference of the inner member is thus flatter than the convex wedge-shaped edge of the inner circumference of the sealing element. The outer circumference of the inner member is received within the inner circumference of the sealing member such that the convex wedge-shaped edge of the inner circumference of the annular sealing element is wedged into the concave wedge-shaped edge of the outer circumference of the inner member.

The minimum inner diameter at the apex of the convex wedge-shaped edge of the sealing element is less than a maximum outer diameter of the inner member adjacent the opposing first and second faces of the inner member and the first and second faces of the sealing element so as to ensure an overlap of a portion of the sealing element and the inner member in the radial direction. The minimum outer diameter at the apex of the concave wedge-shaped edge of the inner member is typically close to the inner diameter at the apex of the sealing member or may be slightly greater so that inner member tightly fits within the surrounding sealing member.

The inner ring inserted into the sealing element can be any of the following:
  i) A spacer element between the annular sealing element and the inner diameter of the pipes to dampen or stop high velocity turbulence created in the space between sealing element inner diameter and pipe inner diameter;
  ii) a barrier or primary seal between the annular sealing element and the inner diameter of the pipes for applications where the product should not be exposed to metal parts (generally from a compressible material, such as, for example, but not limited to PTFE, CNAF, plastics, and/or rubber);
  iii) an orifice plate having an aperture or orifice therein with a diameter smaller than the inner diameter of the pipes so as to control or limit the flow in a pipe; and
  iv) a blank plate fully spanning the inner diameter of the pipes to block or stop the flow in the pipes.

Figure 17A:
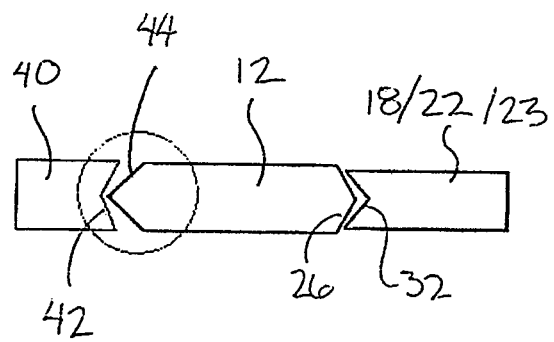
FIG. 17A is a cross sectional view of the sealing element between an inner member and an outer centering ring when the inner member is formed of rigid material.

As shown in FIG. 17A, when the inner member comprises a rigid metal insert, the thickness is substantially identical to a thickness of the sealing member between the first and second faces thereof.

Figure 17B:
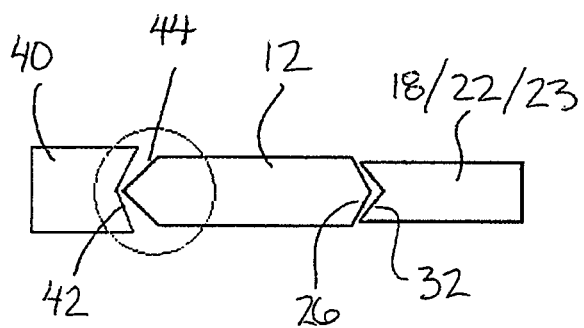
FIG. 17B is a cross sectional view of the sealing element between an inner member and an outer centering ring when the inner member is formed of a material which is softer than the sealing element.

Alternatively as shown in FIG. 17B, when the inner member comprises a material which is softer than a material of the sealing member, the inner member has a thickness which is greater than a thickness of the sealing member between the first and second faces thereof so as to be mounted under compression between the end flanges of the pipe in use.

Now that preferred embodiments of the flange sealing system have been described in detail, it will be apparent that the described embodiments provide a number of advantages over the prior art, including the following:
  i) Overcome the need for different gaskets for each pressure class and each international flange standard.
  ii) Non-contact components (centering ring) require no replacement.
  iii) The sealing element can be replaced and/or refurbished many times.
  iv) Reduces stockholding and inventory by 50-70% with consequent cost savings in inventory, warehousing and transport.
  v) Reduces the risk of incorrect stock on hand or incorrect gasket being installed.
  vi) Increased reliability of flange joints.
  vii) Makes use of superior serrated gasket technologies more cost effective.

It will be readily apparent to persons skilled in the relevant arts that various modifications and improvements may be made to the foregoing embodiments, in addition to those already described, without departing from the basic inventive concepts of the present invention. For example, the sealing element design permits the addition of an alternate primary sealing element to be fitted to the inside diameter if required by specific applications. Therefore, it will be appreciated that the scope of the invention is not limited to the specific embodiments described.

The invention claimed is:

1. A sealing element in combination with a flange sealing system including a pair of pipe end flanges of adjoining pipes and a centering ring mounted between the end flanges, the annular sealing element comprising:
  an annular solid core structure having an outer circumference wedged within the inner circumference of the centering ring and having first and second faces arranged for sealing engagement with respective ones of the end flanges so as to provide a fluid-tight seal between the end flanges;
  wherein one of the inner circumference of the centering ring and the outer circumference of the sealing element has a wedge-shaped cross-section in the form of a convex wedge-shaped edge comprising first and second surface portions that are generally flat and transverse relative to one another so as to project outwardly towards a central apex and so as to define an interior angle between the first and second surface portions which is less than 180 degrees, and another one of the inner circumference of the centering ring and the outer circumference of the sealing element has a concave cross-section in the form of a concave wedge-shaped edge comprising first and second surface portions that are generally flat and transverse relative to one another so as to be inclined inwardly towards a recessed central apex and define an exterior angle between the first and second surface portions which is less than 180 degrees and so as to be shaped to receive the convex wedge-shaped edge therein, and
  wherein the interior angle between the first and second surface portions of the convex wedge-shaped edge that are generally flat is greater than the exterior angle between the first and second surface portions of the concave wedge-shaped edge that are generally flat such that the sealing element is readily removable from the centering ring.

2. The combination according to claim 1 wherein:
  the centering ring comprises a discontinuous centering ring received between the pipe end flanges surrounding the annular sealing element so as to be arranged to locate the sealing element relative to the fastening of the pipe end flanges;
  the discontinuous centering ring is discontinuous in a circumferential direction of the centering ring between two ends of the discontinuous centering ring which are disconnected from one another in a mounted position between the pipe end flanges;
  the discontinuous centering ring being flexible relative to the sealing element so as to permit insertion and removal of the sealing element within the centering ring; and
  the discontinuous centering ring being resilient such that the sealing element is retained in the discontinuous centering ring solely by tension of the discontinuous centering ring which compresses the outer circumference of the sealing element within the inner circumference of the discontinuous centering ring.

3. The combination according to claim 1 wherein one of the inner circumference of the centering ring and the outer circumference of the sealing element has a wedge-shaped cross-section in the form of a convex wedge-shaped edge comprising first and second surface portions which are generally flat and transverse relative to one another so as to project outwardly towards a central apex and so as to define an interior angle between the first and second surface portions which is less than 180 degrees, and another one of the inner circumference of the centering ring and the outer circumference of the sealing element has a concave cross-section in the form of a concave wedge-shaped edge comprising first and second surface portions which are generally flat and transverse relative to one another so as to be inclined inwardly towards a recessed central apex and define an exterior angle between the first and second surface portions which is less than 180 degrees and so as to be shaped to receive the convex wedge-shaped edge therein, and wherein the interior angle between the first and second surface portions of the convex wedge-shaped edge is greater than the exterior angle between the first and second surface portions of the concave wedge-shaped edge.

4. The combination according to claim 1 wherein the centering ring has a concave wedge-shaped edge on the inner circumference and wherein the sealing element has a convex wedge-shaped edge on the outer circumference thereof.

5. The combination according to claim 4 wherein an outer diameter of the apex of the convex wedge-shaped edge of the sealing element is less than a maximum inner diameter of the centering ring at the apex of the concave wedge-shaped edge and is greater than an minimum inner diameter of the concave wedge-shaped edge of the centering ring adjacent the first and second faces of the sealing element.

6. The combination according to claim 1 further comprising an inner member having an outer circumference comprising a concave wedge-shaped edge, wherein the annular sealing element has an inner circumference comprising a convex wedge-shaped edge, the outer circumference of the inner member being received within the inner circumference of the sealing element such that the convex wedge-shaped edge of the inner circumference of the annular sealing element is received within the concave wedge-shaped edge of the outer circumference of the inner member.

7. The combination according to claim 6 wherein the concave wedge-shaped edge of the outer circumference of the inner member comprises first and second surface portions which are generally flat and transverse relative to one another so as to be inclined inwardly towards a recessed central apex and so as to define an exterior angle between the first and second surface portions which is less than 180 degrees and the convex wedge-shaped edge of the inner circumference of the sealing element comprises first and second surface portions which are generally flat and transverse relative to one another so as to project outwardly towards a central apex and define an interior angle between the first and second surface portions which is less than 180 degrees, and wherein the exterior angle between the first and second surface portions of the concave wedge shaped edge is greater than the interior angle between the first and second surface portions of the convex wedge-shaped edge of the inner circumference of the sealing element.

8. The combination according to claim 6 wherein the inner member comprises a spacer spanning between the sealing element and an inner diameter of the pipes.

9. The combination according to claim 6 wherein the inner member comprises a metal insert having a thickness which is substantially identical to a thickness of the sealing element between the first and second faces thereof.

10. The combination according to claim 6 wherein the inner member comprises a material which is softer than a material of the sealing element, the inner member having a thickness which is greater than a thickness of the sealing element between the first and second faces thereof.

11. The combination according to claim 2 wherein the pair of pipe end flanges are joined to one another by suitable fastening comprising a plurality of flange bolts and wherein the flange sealing system further comprises a mounting ring fixed at the outer circumference of the centering ring diametrically opposite from said two ends of the centering ring so as to be received between the pipe end flanges together with the centering ring, the mounting ring defining a fastener aperture extending therethrough and being located relative to the centering ring so as to receive a respective one of the flange bolts therethrough.

12. The combination according to claim 2 wherein the centering ring is made discontinuous by the provision of a radial cut which forms a gap in the circumference of the ring which is between about 1.0 mm to 2.0 mm wide in the circumferential direction.

13. The combination according to claim 1 in combination with a plurality of centering rings of different size so as to be arranged to fit a wide range of standard pipe and flange sizes, each centering ring comprising an inner circumference into which the outer circumference of said annular sealing element is arranged to be wedged such that the plurality of centering rings are interchangeable with one another.

14. The combination according to claim 1 wherein the first and second faces of the sealing element are each formed with a serrated surface.

15. The combination according to claim 1 wherein the first and second faces of the sealing element are provided with a suitable sealing compound to further improve the fluid-tight seal.

16. The combination according to claim 15 wherein the sealing compound is selected from the group including polytetrafluoroethylene, graphite, a mica based compound, composite non-asbestos fiber, and rubber based laminations.

17. The combination according to claim 1 in further combination with an inner member having an outer circumference comprising a concave wedge-shaped edge, wherein the annular sealing element has an inner circumference comprising a convex wedge-shaped edge, the outer circumference of the inner member being received within the inner circumference of the sealing element such that the convex wedge-shaped edge of the inner circumference of the annular sealing element is received within the concave wedge-shaped edge of the outer circumference of the inner member.

18. The combination according to claim 1 wherein the centering ring comprises a full face centering ring.

19. The combination according to claim 1 wherein the sealing element comprises a solid core sealing element.

20. The combination according to claim 1 wherein the wedge-shaped edge at the outer circumference of the sealing element consists solely of the first and second surface portions which are generally flat and meet at the respective central apex.

21. The combination according to claim 20 wherein the wedge shaped edge at the inner circumference of the centering ring consists solely of the first and second surface portions which are generally flat and meet at the respective central apex.

22. The combination according to claim 1 wherein the outer circumference of the sealing element is wedged within the inner circumference of the centering ring such that the compressive engagement between the sealing element and the centering ring is limited to two annular contact areas which are spaced apart from one another adjacent said first and second faces of the annular solid core structure.

23. The combination according to claim 1 wherein the interior angle between the first and second surface portions of the convex wedge-shaped edge is greater than the exterior angle between the first and second surface portions of the concave wedge-shaped edge by at least 10 degrees.

24. The combination according to claim 1 wherein the interior angle between the first and second surface portions of the convex wedge-shaped edge is greater than the exterior angle between the first and second surface portions of the concave wedge-shaped edge by approximately 30 degrees.

25. The combination according to claim 22 wherein a gap between the first and second surface portions of the convex wedge-shaped edge and the first and second surface portions of the concave wedge-shaped edge varies in dimension between said two annular contact areas.

26. The combination according to claim 1 wherein the first and second surface portions of the convex wedge shaped edge are non-parallel in relation to the first and second surface portions of the concave wedge shaped edge so as to define a resultant gap between the first and second surface portions of the convex wedge shaped edge and the first and second surface portions of the concave wedge shaped edge that varies in dimension.

* * * * *